United States Patent Office 3,317,313
Patented May 2, 1967

3,317,313
PROCESS FOR THE RECOVERY OF GOLD AND SILVER FROM GOLD AND SILVER BEARING AQUEOUS CYANIDE LIQUORS AND ION EXCHANGE RESIN EMPLOYED THEREIN
Anthony Arthur Büggs, Surbiton, Norman Frank Kember, Sutton Valence, near Maidstone, and Ronald Alfred Wells, Walton-on-Thames, England, assignors to National Development Research Corporation, London, England, a British corporation
No Drawing. Filed Aug. 21, 1961, Ser. No. 132,569
Claims priority, application Great Britain, Aug. 25, 1960, 29,447/60
11 Claims. (Cl. 75—118)

This invention relates to ion exchange resins showing preferential adsorption for the complex anions of auro- and argento-cyanides and an improved process for the recovery of gold and silver from gold and silver bearing aqueous cyanide liquors.

Copending application No. 83,873 filed Jan. 23, 1961 by Büggs et al. and now abandoned, discloses low capacity, strong base anion exchange resins formed by reacting from 10 to 60 percent of the halomethyl groups in a halomethylated polymerised aromatic monomer with tertiary alkylamines in which the alkyl groups contain 4 or more carbon atoms and a process for the recovery of gold and silver from aqueous cyanide liquors by contacting the liquors with the resins.

It has now been found that a still further improved recovery of gold can be effected by means of a new mixed strong base/weak base resins. Accordingly the present invention provides strong base/weak resins useful for the recovery of gold and silver from gold and silver bearing aqueous cyanide liquors, comprising co-polymers of mono-vinyl benzene with from 1 to 5% divinyl benzene and having anion exchange groups which are quaternary amino groups (strong base) and tertiary amino groups (weak base) present to the extent of approximately one such exchange group per styrene residue of the polymer, the strong base groups consisting of groups of the type —$CH_2$—$N^+R^1R^2R^3$ and the weak base groups of groups of the type —$CH_2$—N—$RR^0$ where $R^1$, $R^2$, $R^3$, R and $R^0$ are alkyl groups which may be the same or different, said alkyl groups containing not less than 4 carbon atoms, and being branched or unbranched and if they are branched the branch not being in the 1 carbon position, the proportion of strong base groups being between 20 and 60 percent and preferably between 20 and 40 percent of the total pure exchange groups present.

A particularly suitable resin is one in which all the alkyl groups are butyl groups.

The resins provided by the invention can be prepared by forming a low substituted, strong base resin of a type similar to that described in copending application No. 83,873 except that the D.V.B. content is between 1 and 5%. Thus a fully halomethylated polystyrene or other polymerised aromatic monomer cross-linked with between 1 and 5 percent of D.V.B. is reacted with one or more tertiary alkylamines of the general formula $R_3N$ in which each R represents the same or different alkyl groups which each have at least 4 carbon atoms, until from 20 to 60 percent of the halogen present in the halomethyl groups has been replaced by the tertiary amino group. The product is washed and dried and subsequently treated with one or more di-alkylamines with general formula $NHR_2^0$ where $R^0$ represents the same or different alkyl groups which contain at least 4 carbon atoms whereby the halogen of the unreacted halomethyl groups in the trialkylamine resins is replaced.

Halomethylated polystyrene made by normal methods or commercially available halomethylated polystyrene may be used in making the resins. The halomethylated polystyrene may conveniently be made by a process which comprises carrying out the halomethylation with the halomethylated agent diluted during the refluxing stage with an inert organic solvent, the more volatile products boiling up to 53° C. being removed from the top of the fractionating column.

The resins according to the invention have the random distribution of strong-base groups required for high gold capacity and selectivity while the larger total ion-exchange capacity of the resins imparts a higher water regain and in turn faster reaction rate. Since the added weak base groups are themselves gold selective gold capacity is obtatined higher than that of a single aminated resin.

Accordingly the invention also provides a process for the recovery of gold and silver from gold and silver bearing aqueous cyanide liquors which comprises contacting said liquors with a resin according to the invention whereby gold and silver are absorbed upon the resin and subsequently eluting the gold and silver from the resins, with a suitable eluting agent.

Particularly high values for absorption are obtained if the resins are finely ground.

The gold can be eluted from the resins according to the invention with eluting agents comprising aqueous solutions of organic eluting materials, for instance, thiourea in aqueous hydrochloric acid, or the organic eluting material may be dissolved in a mixture of an organic solvent and water, in which case an inorganic eluting material may also be present. Examples of such eluting agents include a solution of urea (1.0 M) and hydrochloric acid (1.0 M) in methanol (88% w./v.) and water (12% w./v.) and a solution made up of thiourea (0.5 M) potassium thiocyanate (0.5 M) and hydrochloric acid (0.7 M) in methanol (90% w./v.) and water (10% w./v.) and filtered to remove potassium chloride. If inorganic eluting materials alone are used the solvent must either be an organic solvent or a mixture of a predominant amount of an organic solvent and water. Ammonium thiocyanate in aqueous methanol solution is a particularly suitable eluting agent. Inorganic eluting materials in aqueous solution are found to be unsatisfactory since elution of the desired metals is slow and incomplete.

The invention is further illustrated by the following examples:

*Example 1*

40 g. of chlormethylated polystyrene beads, cross-linked with 3% divinyl benzene were soaked overnight with 180 ml. of chlorobenzene, 80 ml. of tri-n-butylamine was then added and the temperature raised to 100° C. for 6 hours. The resin was washed and dried in the normal way, giving a product of total chloride capacity 1.1 meq./g. and water regain 0.24 g./g. This resin taken to column equilibrium with a liquor containing 5 p.p.m. Au, 40 p.p.m. Ni, 200 p.p.m. CNS⁻, 150 p.p.m. excess KCN and adjusted to pH 11.0 with KOH, absorbed 45.6 mg. of Au and 2.3 mg. of Ni/g. of resin.

Single-aminated resin (55 g.) was re-swollen in 220 ml. of dioxan overnight, 110 ml. of di-n-butylamine was added and the temperature raised to 100° C. for 6 hours. The final resin was washed in the normal way giving a product of total chloride capacity 3.1 meq./g. and water regain 0.75 g./g. Tested in the same solution the resin adsorbed 70.6 mg. of Au and 15.1 mg. of Ni/g. of resin.

A column of the doubly-aminated resin equivalent to 9.58 g. dry resin was treated with alkaline sodium thiocyanate solution in order that it should more closely resemble the condition expected after a cycle of loading and elution. The column then occupied 19 ml. Liquor containing 6 p.p.m. Au, 40 p.p.m. Ni, 30 p.p.m. Cu, 24 p.p.m. Fe, 96 p.p.m. CNS, 150 p.p.m. excess KCN and adjusted to pH with NaOH was passed at the rate of 2 ml./min. Breakthrough of gold occurred after passage of 118 litres when the resin loading was 74 mg. Au/g. (37 g. Au/l.). The resin continued to absorb gold from the liquor e.g. after passage of 160 litres it was absorbing 86% of the gold from the liquor. A separate sample of similar pre-treated resin taken to column equilibrium with liquor of the same composition was found to absorb, per gram of dry resin, 144 mg. Au, 13.6 mg. Ni, 3.0 mg. Cu, and 0.8 mg. Fe. A further pre-treated sample taken to column equilibrium with liquor modified by the addition of 2 p.p.m. Ag as potassium argentocyanide was found to absorb, per gram of dry resin, 100 mg. Au, 5.2 mg. Ni, 1.0 mg. Cu, 0.7 mg. Fe and 13.2 mg. Ag.

*Example 2*

Chlormethylated polystyrene beads (10 g.) cross-linked with 2% divinyl benzene were soaked overnight in 50 ml. of chlorobenzene, 20 ml. of tri-butylamine then being added and the temperature raised to 100° C. for seven hours. The resin was washed as in Example 1 and air dried, giving a product of total chloride capacity 1.6 meq./g. This resin taken to column equilibrium with a liquor of the same composition as that given in Example 1 absorbed 31.4 mg./l. of 5 p.p.m. Au and 33.2 mg. of Ni./g. of resin.

The single aminated resin (5 g.) was re-swollen overnight in 25 ml. of dioxan, 10 ml. of di-butylamine was added and the temperature raised to 100° C. for 6 hours. The final resin was washed as in Example 1 giving a product of total chloride capacity 3.1 meq./g. Tested in a solution of the same composition as that given above the resin adsorbed 76.0 mg. of Au and 4.9 mg. of Ni/g. of resin.

*Example 3*

100 g. of polystyrene beads, cross-linked with 2% of divinyl benzene were soaked overnight at 4° C. in 400 ml. of chloromethyl ether. To this mixture was added a solution of 1 ml. of stannic chloride in 100 ml. of chloromethyl ether also at 4° C. The mixture was kept at 4° C. for 24 hours. It was then refluxed under a fractionating column, sufficient iso-octane being added to facilitate stirring while volatile products were removed from the top of the fractionating column. A total of 200 ml. of iso-octane were added during the refluxing period of 6 hours. The beads were filtered, washed three times with dioxan and air dried overnight.

10 g. of the chloromethylated polystyrene beads were soaked overnight in 50 ml. of chlorobenzene, 20 ml. of tri-butylamine was then added and the temperature raised to 100° C. for 6 hours. The resin was washed and dried as in previous examples and gave a product with chloride capacity of 1.6 meq./g. This resin taken to column equilibrium with a liquor of the same composition as in Example 2 absorbed 45.1 mg. of Au and 10.0 mg. of Ni/g. of resin.

10 g. of the beads of the single aminated resin were soaked overnight in 50 ml. of dioxan. 20 ml. of di-butylamine were added and the mixture heated as before. The product after washing and drying gave a resin of chloride capacity 3.1 meq./g. This resin taken to column equilibrium with a liquor of the same composition as in Example 2 adsorbed 73 mg. of Au and 7.9 mg. of Ni/g. of resin.

*Example 4.—Loading from a mine liquor*

A resin prepared by the method disclosed in Example 2, chloride capacity 2.8 meq./g. (ca. 24% strong base group) weight swelling 0.7 g. per g. chloride form, was treated with mine liquors of the following compositions in mg. per litre.

Au 9–16, Ag 0.8–2.0, Cu 10–50, Ni 8–13, Fe 0.8–7, Zn 16–60, total cyanide 100–150 CNS⁻ 60–80.

The liquor was allowed to flow through a column 1 cm. in diameter containing 40 ml. of the chloride form of the resin the flow rate being 10 ml./min. (0.25 B.V. per minute). At termination of the experiment the loading (not equilibrium) of the resin after passage of 400 litres of solution per litre of chloride form resin was 82.3 g. Au, 2.34 g. Ag.

*Tables showing elution of metals*

(I) Elution from a column of resin prepared according to Example 2 loaded with 130 mg. Au, 14 mg. Ni per g. resin.

| Composition of Eluting Agent. | 5% w./v. thiourea 95% aqueous HCl (5% v./v.) |
|---|---|
| Rate of Elution in B.V. per hour | 2 |
| Total Volume of Eluate in Bed Vols | 23 | 44 |
| Amount of Au eluted | 97 | 99.5 |

(II) Elution of metals from a 40 ml. column of resin prepared according to Example 2 loaded with 3.29 g. Au, and 0.053 g. Ag.

| Composition of eluting agent. | 25% KCNS, w./v. 75% water | 5% KCNS, w./v. 95% methanol | |
|---|---|---|---|
| Rate of Elution in B.V. per hour | 2 | 2 | |
| Total Volume of Eluate in Bed Vols | 35 | 8 | 28 |
| Amount of Au Eluted | 10 | 99.5 | |
| Amount of Ag Eluted | 5 | 55 | 97 |

What we claim is:
1. Anion exchange resins containing strongly basic and weakly basic exchange groups and suitable for use in the recovery of gold and silver from gold and silver bearing aqueous cyanide liquids comprising copolymers of monovinyl benzene and from 1 to 5% divinyl benzene, said copolymers having both strong base quaternary amino anion exchange groups and weak base tertiary amino anion exchange groups present to the extent of approximately one such exchange group per styrene residue of the copolymer, the strong base groups consisting of groups of the general formula

$$-CH_2-NR^1R^2R^3$$

and the weak base groups of the groups of the general formula $-CH_2-NRR^0$ where R, $R^1$, $R^2$, $R^3$ and $R^0$ are selected from the group consisting of straight chain alkyl groups having not less than 4 carbon atoms and alkyl groups containing not less than 4 carbon atoms, which groups are branched on any point other than the 1 carbon position, the proportion of strong base amino groups being between 20 and 60% of the total pure exchange groups present.

2. Resins according to claim 1 wherein all the alkyl groups are butyl groups.

3. A process for the recovery of gold and silver from gold and silver bearing aqueous cyanide liquors which comprises contacting the liquors with an anion exchange resin containing strongly basic and weakly basic exchange groups, said anion exchange resin comprising a copolymer of monovinyl benzene and from 1 to 5% divinyl benzene, said copolymer having both strong base quaternary amino anion exchange groups and weak base tertiary amino anion exchange groups present to the extent of approximately one such exchange group per styrene residue of the copolymer, the strong base groups consisting of groups of the general formula 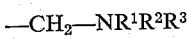 $-CH_2-NR^1R^2R^3$ and the weak base groups of the groups of the general formula —$CH_2$—$NRR^0$ where R, $R^1$, $R^2$, $R^3$ and $R^0$ are selected from the group consisting of straight chain alkyl groups having not less than 4 carbon atoms and alkyl groups containing not less than 4 carbon atoms, which groups are branched on any point other than the 1 carbon position, the proportion of strong base amino groups being between 20 and 60% of the total pure exchange groups present, and subsequently eluting the gold and silver from the resin.

4. A process according to claim 3 wherein the resin is in finely ground form.

5. A process according to claim 3 which comprises using as the eluting agent an aqueous solution of an organic eluting material.

6. A process according to claim 3 wherein the eluting agent is a solution of thiorea in aqueous hydrochloric acid.

7. A process as claimed in claim 3 wherein the eluting agent is a solution of 1.0 mol of urea and 1.0 mol of hydrochloric acid in a mixture of 88% w./v. of methanol and 12% w./v. of water.

8. A process as claimed in claim 3 wherein the eluting agent is a solution of 0.5 mol of urea, 0.5 mol of potassium thiocyanate and 0.7 mol of hydrochloric acid in 90% w./v. of methanol and 10% w./v. of water.

9. A process for the recovery of gold and silver from gold and silver bearing aqueous cyanide liquors which comprises contacting the liquors with an anion exchange resin containing strongly basic and weakly basic exchange groups, said anion exchange resin comprising a copolymer of monovinyl benzene and from 1 to 5% divinyl benzene, said copolymer having both strong base quaternary amino anion exchange groups and weak base tertiary amino anion exchange groups present to the extent of approximately one such exchange group per styrene residue of the copolymer, the strong base groups consisting of groups of the general formula —$CH_2$—$NR^1R^2R^3$ and the weak base groups of the groups of the general formula —$CH_2$—$NRR^0$ where R, $R^1$, $R^2$, $R^3$ and $R^0$ are selected from the group consisting of straight chain alkyl groups having not less than 4 carbon atoms and alkyl groups containing not less than 4 carbon atoms, which groups are branched on any point other than the 1 carbon position, the proportion of strong base amino groups being between 20 and 60% of the total pure exchange groups present, and subsequently eluting the gold and silver from the resin by contacting same with an eluting agent comprising a solution or an organic eluting material in a mixture of an organic solvent and water.

10. A process as claimed in claim 9 wherein the eluting agent is a solution of ammonium thiocyanate in aqueous methanol.

11. A process for the recovery of gold and silver from gold and silver bearing aqueous cyanide liquors which comprises contacting the liquors with an anion exchange resin containing strongly basic and weakly basic exchange groups, said anion exchange resin comprising a copolymer of monovinyl benzene and from 1 to 5% divinyl benzene, said copolymer having both strong base quaternary amino anion exchange groups and weak base tertiary amino anion exchange groups present to the extent of approximately one such exchange group per styrene residue of the copolymer, the strong base groups consisting of groups of the general formula

—$CH_2$—$NR^1R^2R^3$ and the weak base groups of the groups of the general formula

—$CH_2$—$NRR^0$ where R, $R^1$, $R^2$, $R^3$ and $R^0$ are selected from the group consisting of straight chain alkyl groups having not less than 4 carbon atoms and alkyl groups containing not less than 4 carbon atoms, which groups are branched on any point other than the 1 carbon position, the proportion of strong base amino groups being between 20 and 60% of the total pure exchange groups present, and subsequently eluting the gold and silver from the resin using as the eluting agent a solution of an inorganic eluting material in a solvent selected from the group consisting of an organic solvent and an organic solvent in admixture with water.

References Cited by the Examiner

UNITED STATES PATENTS

| | | | |
|---|---|---|---|
| 2,632,001 | 3/1953 | McMaster | 260—2.1 |
| 2,788,331 | 4/1957 | Greer | 260—2.1 |
| 3,001,868 | 9/1961 | Aveston | 75—118 |

WILLIAM H. SHORT, *Primary Examiner.*

HAROLD N. BURSTEIN, *Examiner.*

C. A. WENDEL, J. T. MARTIN, *Assistant Examiners.*